Patented Apr. 20, 1948

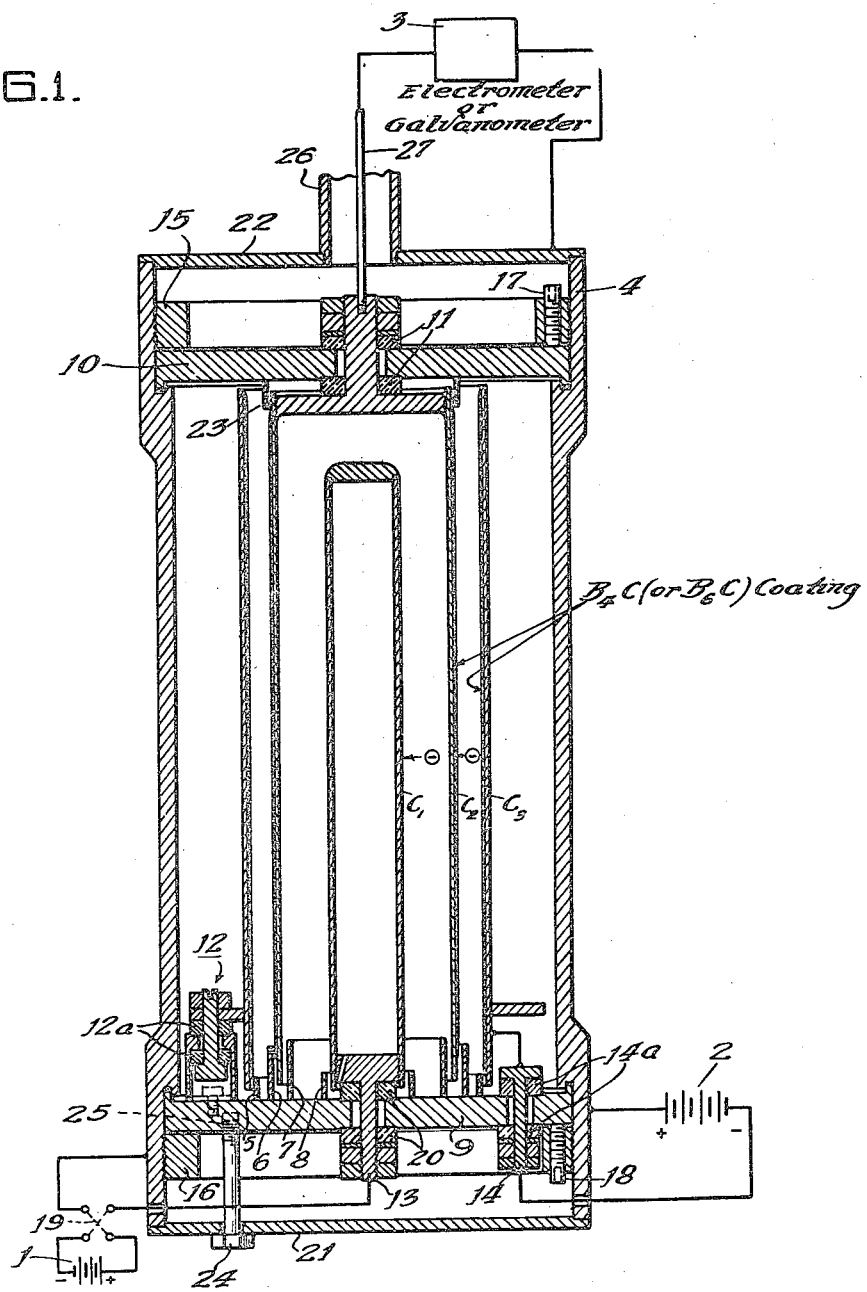

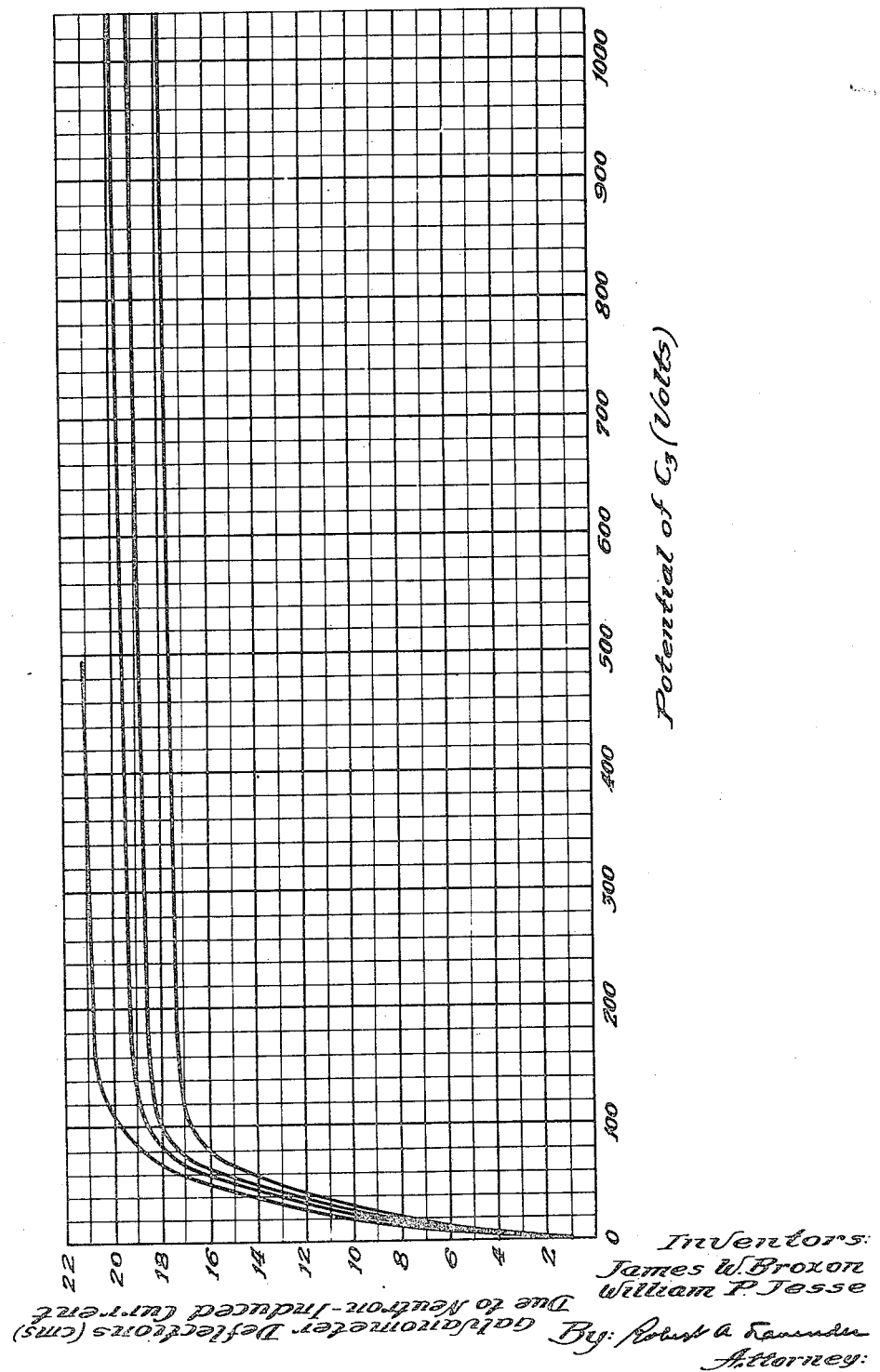

2,440,167

UNITED STATES PATENT OFFICE 2,440,167

DIFFERENTIAL ION CHAMBER

James W. Broxon and William P. Jesse, Chicago, Ill., assignors to the United States of America as represented by the United States Atomic Energy Commission Application January 20, 1944, Serial No. 518,972

20 Claims. (Cl. 250—83.6)

Our invention relates to a device for measuring radiation intensity, particularly that of slow neutrons.

An object of our invention is to provide an electrical measuring device for measuring the effects of slow neutron radiation separately from those of other penetrating radiations, such as gamma rays and fast neutrons.

A more specific object of our invention is to provide a device in the form of a differential ion chamber which is selectively operable to measure either the combined effects or the separate effects of slow neutrons and other penetrating radiations such as gamma rays and fast neutrons.

Other objects and advantages of our invention will become more apparent from the following description and drawings, in which:

Fig. 1 is a cross-sectional view of a differential ionization chamber wherein the electrical circuit is illustrated schematically; Fig. 2 is a graph showing galvanometer deflections due to neutron-induced currents plotted against the voltage applied to one of the electrodes of the device shown in Fig. 1 and showing a plurality of "saturation" curves for different radiation intensities.

Referring more particularly to Fig. 1, $C_1$, $C_2$, and $C_3$ denote separate cylindrical electrodes which, in conjunction with a guard system to be described hereinafter, define two adjacent sub-chambers or regions, $C_1$—$C_2$ and $C_2$—$C_3$, respectively. These regions are of substantially equal volume, for example, about 800 c. c. each. The outermost region, $C_2$—$C_3$, has interiorly on its walls a coating of material which emits alpha particles when bombarded by slow neutrons, such as one containing boron or lithium. Boron carbide is very suitable since it can be readily applied as a coating. A certain potential relative to the guard or instrument case is applied to electrode $C_1$ by a battery 1 and a potential of opposite sign is applied to electrode $C_3$ by a battery 2, whereas the collecting electrode $C_2$ assumes a potential not differing greatly from that of the guard or instrument case by virtue of a connection through a current-indicating instrument 3, such as an electrometer or a galvanometer, which is connected between electrode $C_2$ and a metallic outer casing 4. Casing 4 may be grounded if desired. A plurality of cylindrical metallic guard rings 5, 6, 7, 8, and 23 comprising the guard system are supported on end plates 9 and 10 (for example, as shown) and serve to minimize errors due to insulation leakage and electrostatic induction effects and, in addition, serve together with the cylindrical electrodes $C_1$, $C_2$, and $C_3$, to define the volumes of regions or sub-chambers $C_1$—$C_2$ and $C_2$—$C_3$, respectively. The purpose of the guard rings may be better understood by considering the field conditions, for example, involving insulators 20 and 11. The upper insulator 20 is subjected to an intense electric field due to the potential difference maintained between electrode $C_1$ and the guard system which includes plate 9. Some surface leakage is likely to occur even on very good insulators. Also, insulators subjected to strong electric fields become polarized, that is, the positive and negative charges thereon are separated, but not sufficiently to be pulled out of their original atoms or molecules. Either surface charges or virtual charges due to polarization of the insulator would affect the potential of the collecting electrode $C_2$ unless prevented from doing so by a constant-potential conductor such as the guard ring 8. Since surface leakage in particular is likely to be quite erratic, shielding of this nature is important. Reference is now made to the lower insulator 11 located between electrode $C_2$ and end plate 10 of the guard system. Since the potential difference between these conductors is never allowed to become very great, it is possible to prevent appreciable polarization of lower insulator 11. However, electrode $C_3$ is maintained at a potential differing greatly from that of the guard system. Consequently, guard ring 23 is desired to insure that lower insulator 11 will not become polarized under the influence of the strong electric field between electrode $C_3$ and the guard system. Such polarization of insulator 11 would affect the potential of $C_2$ and hence change the reading obtained with current indicating instrument 3. Since the inner edges of these guard rings partially define the effective volumes of the sub-chambers or regions, then by making the end plates 9 and 10 vertically adjustable, say by the introduction of gaskets of different thickness between the end plates 9 or 10 and the shoulders of outer casing 4, or by merely replacing these rings with rings of different sizes, these volumes are made adjustable.

Electrode $C_3$ is supported by a plurality of insulated supports and spacing assemblies such as 12 each provided with insulation washers 12a. An insulated lead-in 14 employing insulation washers 14a is provided for electrode $C_3$. Electrode $C_1$ is supported by insulating washers 20 from end plate 9 much as $C_2$ is supported from end plate 10. Electrode $C_2$ is supported on end plate 10 by insulation washers 11 which electrically insulate this electrode from said end plate. Washers 11, 12a, 14a, and 20 are preferably made of quartz, amber or other excellent insulating material. However, the insulation for $C_1$ and $C_3$ need not be so extremely high as the insulation for $C_2$, and consequently washers 12a, 14a, and 20 may be made of lower quality of material although they must be capable of withstanding several hundreds or even more than a thousand volts. Small electrical leaks over the washers 12a, 14a, and 20 are not important since they do not register on the indicating instrument 3. The end plates 10 and 9 are secured in vacuum or pressure tight relationship to the outer casing 4 by means of a plurality of set screws such as 17 and 18 which are symmetrically spaced around and pass through rings 15 and 16, respectively. The rings 15 and 16 are threaded into the ends of the cylindrical case 4, and either these rings or the screws 17 and 18 are used to exert pressure upon end plates 9 and 10, forcing tongues on these against gaskets of material such as rubber, tin, lead, or other yielding material located in grooves as shown near the ends of the cylindrical case 4. The several insulating washers supporting electrodes $C_1$ and $C_2$ and supporting the lead-in for electrode $C_3$, together with associated systems of thin gaskets, metal washers, and nuts, as shown, serve to complete the vacuum seal. As will be understood by those familiar with the art, suitable means may also be provided such as a needle valve (not shown) in end plate 10 (or in end plate 9 or case 4), through which the chamber may be evacuated and filled with various gases.

The lower cover plate 21 serves to keep out dust. It is fastened by one or more bolts 24 which pass through apertures in the plate 21 and into corresponding threaded bores 25 in plate 9. Similarly, the upper cover plate 22 serves to keep out dust and is fastened by one or more bolts (not shown) similar to bolt 24. Cover plate 22, together with a tube 26, continues the guard system for connecting electrode $C_2$ and the lead-in 27 to the current indicating device 3.

The entire chamber is preferably filled with an inert gas such as helium or argon or similar gas, at or near atmospheric or even at higher pressures, with which gas it is easy to attain saturation currents at relatively high radiation intensities, using ordinary applied voltages. Helium and argon are especially suitable because they have the following advantageous characteristics: appreciable ionization is produced by the neutron induced alpha particles; saturation currents with a particular electrode configuration and radiation intensity can be readily obtained with relatively small applied potential differences; these gases are not chemically active and will not cause deterioration of the insulation or other exposed parts; in the event of leakage from the container, the escaping gas is not harmful; and helium does not become undesirably radioactive when bombarded by neutrons, although argon may become somewhat disturbingly radioactive if subjected to very intense neutron radiation for long intervals of time. Saturation is more difficult to obtain the higher the pressure because recombination of the ions is more difficult to reduce at higher pressures. However, at low pressures the range of the alpha particles is increased and the alpha particles may go clear across to another electrode and waste some of their energy that otherwise could have been used in ionizing collisions with the gas. Hence, for each gas there is an optimum pressure depending on the electrode spacing and the coating material that will just allow the alpha particles to travel the region between the electrodes. Such optimum pressure, in a given case, can be readily determined by test or calculation.

The operation of the device is as follows:

If a positive potential (say about 360 volts) is applied to electrode $C_1$ and negative potential (say about 1035 volts) is applied to electrode $C_3$, it will be apparent that if the device is subjected to slow neutron radiations and other penetrating radiations such as gamma rays and fast neutrons, all occurring simultaneously, the other penetrating radiations (gamma rays, fast neutrons, etc.) will either directly or indirectly ionize the gaseous medium in intercommunicating regions $C_1$—$C_2$ and $C_2$—$C_3$. Gamma rays bombard the gas included in the electric field and produce beta rays in an amount proportional to the volume of such gas. Negative ions developed in region $C_2$—$C_3$ move towards electrode $C_2$, whereas negative ions developed in region $C_1$—$C_2$ will move away from electrode $C_2$. Inasmuch as the volumes of these regions, as well as the pressures, are substantially equal, the net number of negative ions collected by $C_2$ is zero if conditions are ideal, and as explained hereinbelow, is close enough to zero for practical purposes, under ordinary conditions of operation of the device. A similar situation exists relative to the positive ions in the two regions. Hence, so far as the effects of gamma rays or fast neutrons are concerned, there will be no reading on the galvanometer, electrometer, or other indicating-instrument 3. In other words, ion currents due to gamma rays and fast neutrons are effectively cancelled, apart from discrepancies due to divergence of radiation beams and absorption and production of subsidiary radiations by the chamber walls, electrodes, etc. These uncancelled effects are commonly small. However, the slow neutron radiations, upon bombarding the interior boron-carbide coating of region $C_2$—$C_3$ will cause emission of alpha particles from such boron-containing coating which will ionize the gas in region $C_2$—$C_3$ but not in region $C_1$—$C_2$ because the thickness of $C_2$ is too great for the alpha particles to penetrate; and there are no locally-produced alpha particles to cause ionization in region $C_1$—$C_2$, since $C_1$—$C_2$ is not coated interiorly. Hence, an excess of ions will be developed in region $C_2$—$C_3$ on account of the slow neutrons, and the excess negative ions will be collected by electrode $C_2$. Current will thus flow through the indicating device 3, this current being practically proportional to the radiation intensity of the slow neutrons which is sometimes expressed by $nv$ (neutron density $\times$ velocity, in neutrons per square cm. per sec.) provided the impressed potential differences are sufficient to provide practical saturation currents.

If instead of measuring the effects of slow neutrons, as described above, it is desired to measure the combined effects of slow neutrons and of other penetrating radiations, such as gamma rays and fast neutrons, electrodes $C_1$ and $C_3$ are brought to potentials of the same sign relative to the guard system. This can be done readily by reversing switch 19. Now the negative ions in region $C_1$—$C_2$ will flow towards the electrode $C_2$ as well as those in region $C_2$—$C_3$. Hence, the combined current will be that produced by the slow neutrons in region $C_2$—$C_3$, having the interior boron carbide coating, plus that produced by the other penetrating radiations such as gamma rays and fast neutrons in both the regions $C_1$—$C_2$ and $C_2$—$C_3$. If it is desired to measure the effects of penetrating radiations due to gamma and fast neutrons only, the previous reading due to slow neutrons alone is subtracted from the latter reading and will give the combined ion currents in both regions, $C_1$—$C_2$ and $C_2$—$C_3$. Since these regions are of equal volume, half this reading will denote the ion current in one of the regions due only to gamma rays and fast neutrons. In this manner the relative intensities of slow neutron and other penetrating radiations occurring, as well as the absolute value of either, can be readily determined upon appropriate calibration of the apparatus.

Fig. 2 shows a graph of galvanometer deflections versus voltage applied to electrode $C_3$ (the currents being due to slow neutrons) and shows a plurality of "saturation" curves representing different radiation intensities. In obtaining these curves, the potential applied to $C_1$ was made equal and opposite to that applied to $C_3$ for voltages less than 315 volts, but the potential applied to $C_1$ was then kept constant while that applied to $C_3$ was increased to higher values. This was due to the fact that such potentials were more than adequate to provide saturation in the inner region, i. e. in the region free from boron. It will be noted that the voltage applied to electrode $C_3$ should be one which is sufficiently high so as to effect practical saturation of the chamber and thus to allow operation in the region of the approximately flat part of the "saturation" curve. That is to say, if practical saturation is obtained, recombination of the ions is substantially eliminated and the ions are collected substantially as fast as they are formed. By operating with an electrode supply voltage corresponding to a region well within the nearly flat or "saturation" part of the "saturation" curve, fluctuations in the supply voltage will have negligible effect on the currents collected and the currents will be substantially directly proportioned to the slow neutron radiation intensities when the potentials of $C_1$ and $C_3$ are of opposite sign relative to the guard. Each of the curves represents a different radiation intensity. It will be noted that if the applied voltage is about 150 volts or more, practical saturation values are obtained with the radiation intensity employed.

The differential ion chamber following the teachings of our invention is particularly advantageous in substantially eliminating the errors otherwise caused by radioactivity of the chamber parts or the contained gas after they are subjected for long periods to intense radiations which may induce radioactivity of the chamber or its contents. Since radiations due to such induced radioactivity would produce substantially equal and opposite effects in the regions $C_1$—$C_2$ and $C_2$—$C_3$, they would substantially cancel each other and the meter reading would not be materially affected thereby, when the instrument is being employed for the measurement of slow neutron radiation as differentiated from other penetrating radiations.

It will be readily apparent that modifications may be made without departing from the spirit and scope of the following claims.

We claim:

1. Apparatus for measuring the radiation intensity of slow neutrons separately from that of other coexistent penetrating radiations such as gamma rays or fast neutrons comprising, in combination, a pair of sub-chambers having wall portions constituting electrodes, only one of said sub-chambers enclosing a material which emits alpha particles when bombarded by slow neutrons, the other of said sub-chambers being devoid of said material, means for applying electrical potentials to each of said electrodes, said electrodes including collecting electrode means for collecting ions formed in both sub-chambers, and means for measuring the flow of the collected ions.

2. Apparatus as recited in claim 1 in which said sub-chambers are of substantially equal volume and include electrostatic guard means which partially define said volumes.

3. Apparatus for measuring the radiation intensity of slow neutrons separately from that of other coexistent penetrating radiations such as gamma rays or fast neutrons comprising, in combination, three electrodes which define a pair of sub-chambers, the interior walls of only one of said sub-chambers being coated with a material which emits alpha particles when bombarded by slow neutrons, the other of said sub-chambers being devoid of said material, means for applying electrical potentials to two of said electrodes, the third electrode serving as a collecting electrode for collecting ions from both sub-chambers, and means for measuring the ion flow to said collecting electrode.

4. Apparatus for measuring the radiation intensity of slow neutrons separately from that of other penetrating radiations such as gamma rays or fast neutrons comprising, in combination, three coaxial cylindrical electrodes which define a pair of sub-chambers of substantially equal volume, the interior walls of only one of said sub-chambers being coated with a material which emits alpha particles when bombarded by slow neutrons, the other of said sub-chambers being devoid of said material, means for applying electrical potentials to two of said electrodes, the third and intermediate electrode serving as a collecting electrode for collecting ions from both sub-chambers, and means for measuring the ion flow through said collecting electrode.

5. Apparatus as recited in claim 1 together with means for selectively applying potentials of opposite sign or of the same sign to said first mentioned two electrodes for measuring slow neutron intensity either alone or taken together with the intensity of other penetrating radiations, respectively.

6. Apparatus for measuring the intensity of slow neutrons exclusive of that of other penetrating radiations such as gamma rays or fast neutrons comprising, in combination, three electrodes which define two sub-chambers, only one of the sub-chambers having its interior walls coated with a material which emits alpha particles when bombarded by slow neutrons, means for applying electrical potentials of opposite sign to two of said electrodes, the third electrode being an intermediate collecting electrode for collecting ions from both of said sub-chambers, and means for measuring the flow of ions to said third collecting electrode.

7. Apparatus as recited in claim 1 in which said sub-chambers are filled with an inert gas at a pressure of the order of atmospheric pressure.

8. Apparatus as recited in claim 1 in which said sub-chambers are filled with argon.

9. Apparatus as recited in claim 1 in which said sub-chambers are filled with helium.

10. Apparatus recited in claim 1 in which said material contains boron.

11. Apparatus recited in claim 1 in which said material contains lithium.

12. Apparatus recited in claim 1 in which said material comprises boron carbide.

13. Apparatus recited in claim 1 in which said sub-chambers contain an ionizable gas at an appropriate pressure so that practical saturation currents are readily attained while efficient use is made of the ability of the alpha particles to produce ions.

14. Apparatus recited in claim 1 in which said potentials are sufficiently high to insure practical saturation currents in both said sub-chambers and said potentials are within a region corresponding to the substantially flat portion of the saturation curve of current flow plotted versus potential applied to one of the first mentioned electrodes.

15. Apparatus as recited in claim 4 in which electrostatic guard rings are provided closely adjacent to the edges of the cylindrical electrodes for defining the volumes of the chambers and for reducing insulation leakage and electrostatic induction effects.

16. The method of determining the percentage of gamma and other penetrating radiation intensity compared to slow neutron radiation intensity that comprises applying potentials of opposite sign to a pair of electrodes contained in an ionizable atmosphere, only one of said electrodes being coated with a material that emits alpha particles when bombarded by slow neutrons, measuring the net ion flow, then applying potentials of the same sign to said pair of electrodes and measuring the total ion flow, then comparing the two values of ion flow.

17. The method of measuring radiation intensity of slow neutrons separately from that of other coexistent penetrating radiations, such as gamma rays or fast neutrons, that comprises the steps of developing a plurality of ion currents resulting from gamma and fast neutron radiations, nullifying said ion currents, bombarding with slow neutrons a material that emits alpha particles when so bombarded in an ionizable atmosphere having a voltage gradient, thereby causing an ion current flow, and measuring said last mentioned ion current flow.

18. The method of measuring radiation intensity of slow neutrons separately from that of other coexistent penetrating radiations, such as gamma rays or fast neutrons, that comprises the steps of developing ion currents resulting from gamma and fast neutron radiations, directing said ion currents in opposition to nullify said ion currents, developing an ion current resulting solely from slow neutron radiation, collecting said last mentioned current, and directing it through a current indicating device.

19. The method of determining the percentage of gamma and other penetrating radiation intensity compared to slow neutron radiation intensity that comprises the steps of applying potentials of opposite sign to a pair of electrodes in a gaseous atmosphere, one of said electrodes being coated with a material that emits alpha particles when bombarded by slow neutrons, measuring ion current flow between said electrodes and a third electrode, then applying potentials of the same sign to said pair of electrodes, measuring the ion curent flow between said pair of electrodes and said third electrode, and then comparing said two values of measured ion current flow.

20. The method of determining the effects of slow neutron radiation intensity exclusive of the effects of gamma and fast neutron radiation intensity that comprises, applying potentials of opposite sign to a pair of electrodes in a gaseous atmosphere, one of said electrodes being coated with a material that emits alpha particles when bombarded by slow neutrons, and measuring the ion current flow between said pair of electrodes and a collecting electrode.

JAMES W. BROXON.
WILLIAM P. JESSE.

REFERENCES CITED

The following references are of record in the file of this patent:

UNITED STATES PATENTS

| Number | Name | Date |
|---|---|---|
| 2,220,509 | Brons | Nov. 5, 1940 |
| 2,288,718 | Kallmann | July 7, 1942 |
| 2,349,753 | Pontecorvo | May 23, 1944 |